US012774679B2

(12) United States Patent
Kovanis et al.

(10) Patent No.: US 12,774,679 B2
(45) Date of Patent: Oct. 27, 2026

(54) NOSECONE FOR A DUCTED FAN GAS TURBINE ENGINE

(71) Applicant: ROLLS-ROYCE plc, London (GB)

(72) Inventors: Anastasios Kovanis, Derby (GB); Andrew Mekeresz, Derby (GB); Ewan F Thompson, Derby (GB)

(73) Assignee: ROLLS-ROYCE plc, London (GB)

( * ) Notice: Subject to any disclaimer, the term of this patent is extended or adjusted under 35 U.S.C. 154(b) by 199 days.

(21) Appl. No.: 18/739,584

(22) Filed: Jun. 11, 2024

(65) Prior Publication Data

US 2026/0043346 A1 Feb. 12, 2026

(30) Foreign Application Priority Data

Jun. 13, 2023 (GR) .............................. 20230100470

(51) Int. Cl.
*F02C 7/00* (2006.01)

(52) U.S. Cl.
CPC ............ *F02C 7/00* (2013.01); *F05D 2220/36* (2013.01)

(58) Field of Classification Search
CPC ... B64C 11/14; F02C 7/00; F02C 7/04; F01D 5/143; F01D 5/145; F01D 5/02; F05D 2220/36; F05D 2250/18; F05D 2250/184; F05D 2250/232; F05D 2250/26
See application file for complete search history.

(56) References Cited

U.S. PATENT DOCUMENTS

| | | | | | |
|---|---|---|---|---|---|
| 1,824,667 | A * | 9/1931 | Grumpelt | B64C 11/00 | 244/65 |
| 1,920,880 | A * | 8/1933 | Parker | B64C 11/04 | 416/175 |
| 2,260,786 | A * | 10/1941 | Muhlenbruck | B64C 11/00 | 416/201 A |
| 2,755,868 | A * | 7/1956 | Smith | B64C 11/14 | 416/239 |
| 3,794,444 | A * | 2/1974 | Campbell | F01D 25/02 | 415/218.1 |

(Continued)

FOREIGN PATENT DOCUMENTS

| | | |
|---|---|---|
| CN | 216554124 U | 5/2022 |
| EP | 1 126 132 A2 | 8/2001 |

(Continued)

OTHER PUBLICATIONS

Nov. 24, 2023 Search Report issued in British Patent Application No. 2311446.5.

(Continued)

*Primary Examiner* — Ryan C Clark
(74) *Attorney, Agent, or Firm* — Oliff PLC

(57) ABSTRACT

A nosecone for a ducted fan gas turbine engine is shown. The nosecone includes a body with an outer surface that tapers in axial extent from an apex to a base of the body, the apex defining a position of 0 percent axial extent and the base defining a position of 100 percent axial extent, and in which the outer surface includes a plurality of undulations extending between a first location on the outer surface and a second location on the outer surface, wherein the first location is positioned at from 0 to 50 percent of axial extent and the second location is positioned at from 85 to 100 percent of axial extent.

19 Claims, 6 Drawing Sheets

(56) References Cited

U.S. PATENT DOCUMENTS

| | | | | | |
|---|---|---|---|---|---|
| 6,840,826 | B2 * | 1/2005 | Fuse | B63H 11/103 440/47 |
| 7,739,865 | B2 * | 6/2010 | Prasad | F02C 7/042 60/226.3 |
| 2014/0186166 | A1 * | 7/2014 | Kostka | F01D 5/143 415/182.1 |
| 2016/0122034 | A1 * | 5/2016 | Bortoli | F01D 25/02 416/142 |

FOREIGN PATENT DOCUMENTS

| | | | | | |
|---|---|---|---|---|---|
| EP | 1 607 603 | A2 | | 12/2005 | |
| GB | 2 369 161 | A | | 5/2002 | |
| JP | 2012026361 | A | * | 2/2012 | |
| WO | 2014/133636 | A2 | | 9/2014 | |
| WO | 2014/143190 | A1 | | 9/2014 | |
| WO | 2020/047658 | A1 | | 3/2020 | |
| WO | WO-2022200733 | A1 | * | 9/2022 | F01D 25/02 |

OTHER PUBLICATIONS

Jun. 18, 2024 Extended Search Report issued in European Patent Application No. 24176261.6.

* cited by examiner

SECTION I-I

SECTION II-II

NOSECONE FOR A DUCTED FAN GAS TURBINE ENGINE

CROSS REFERENCE TO RELATED APPLICATIONS

This application claims priority from Greek patent application number 20230100470 filed Jun. 13, 2023, the whole contents of which are incorporated herein by reference in their entirety.

FIELD

This disclosure relates to a nosecone for a ducted fan gas turbine engine.

BACKGROUND

Fan stages on ducted fan gas turbine engines typically comprise nosecones (also known as "spinners") having a conical or elliptical profile. Use of a streamlined profile in such a manner directs incoming air to the fan stage of the turbofan engine, in which the fan blades are located some radial distance from the engine centreline.

During operation, many complex aerodynamic interactions occur around the root of the fan blades which can affect local efficiency of the fan blade. In addition, it has been observed that the wake from the root passages of the fan can cause undesirable aeromechanical coupling in the front stages of the compression system.

SUMMARY

In an aspect, there is provided a nosecone for a ducted fan gas turbine engine, the nosecone comprising a body with an outer surface that tapers in axial extent from an apex to a base of the body, the apex defining a position of 0 percent axial extent and the base defining a position of 100 percent axial extent, and in which the outer surface comprises a plurality of undulations extending between a first location on the outer surface and a second location on the outer surface, wherein the first location is positioned at from 0 to 50 percent of axial extent and the second location is positioned at from 85 to 100 percent of axial extent.

In another aspect, there is provided a fan assembly for a ducted fan gas turbine engine, comprising:

- a hub with a plurality of fan blades mounted thereto;
- a nosecone mounted to the hub comprising a body with an outer surface that tapers in axial extent from an apex to a base of the body, the apex defining a position of 0 percent axial extent and the base defining a position of 100 percent axial extent, and in which the outer surface comprises a plurality of undulations extending between a first location on the outer surface and a second location on the outer surface, wherein the first location is positioned at from 0 to 50 percent of axial extent and the second location is positioned at from 85 to 100 percent of axial extent.

In another aspect, there is provided a nosecone for a ducted fan gas turbine engine, the nosecone comprising a body with an outer surface that tapers in axial extent from an apex to a base of the body, the apex defining a position of 0 percent axial extent and the base defining a position of 100 percent axial extent, and in which the outer surface comprises a plurality of undulations having an axial extent of from 35 to 100 percent of the axial extent of the body, and wherein each of the plurality of undulations extends circumferentially between a first peak and a second peak with a trough therebetween, wherein the first peak and the second peak both have a hyperbolic axial profile defined between the first location and the second location

BRIEF DESCRIPTION OF THE DRAWINGS

Embodiments will now be described by way of example only with reference to the accompanying drawings, in which.

DETAILED DESCRIPTION

Figure 1:
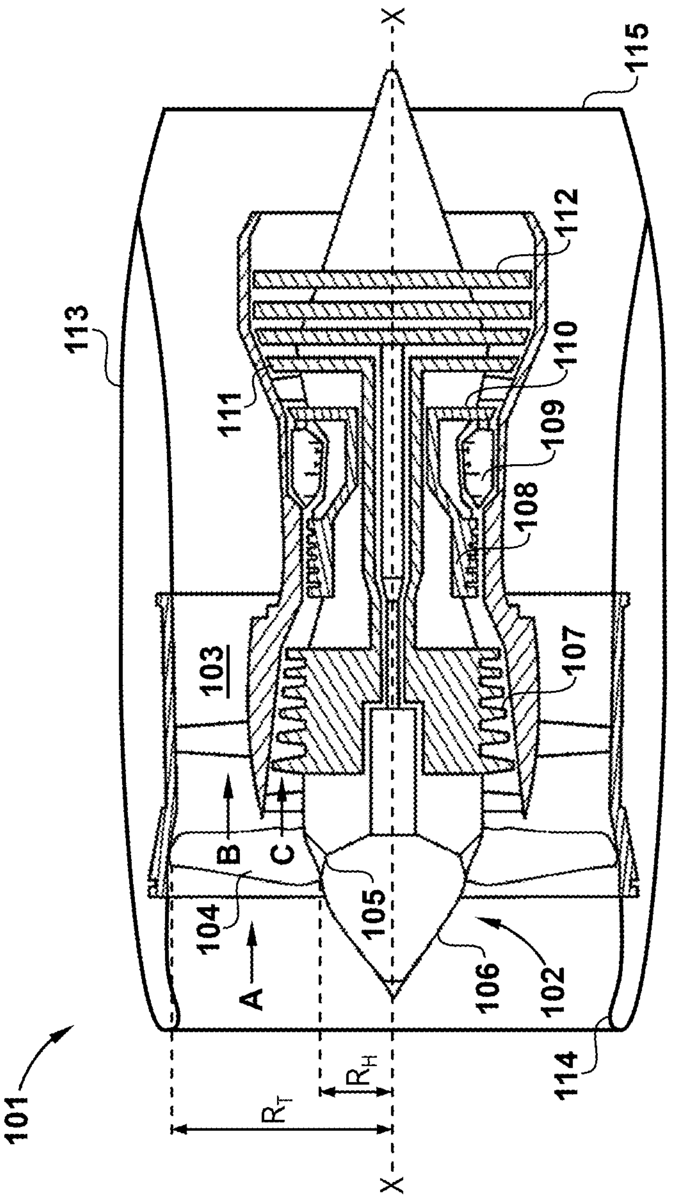
FIG. 1 shows a ducted fan gas turbine engine.

A general arrangement of an engine for an aircraft is shown in FIG. 1. In this embodiment, the engine is a ducted fan gas turbine engine 101 with a principal rotational axis X-X. The engine 101 comprises a fan assembly 102 that receives intake air A.

The fan assembly 102 comprises a plurality of fan blades 104 mounted upon a hub 105, and a nosecone 106 connected with the hub and configurated to rotate therewith. Those skilled in the art will be familiar with the various possible arrangements for mounting fan blades and nosecones to fan hubs, along with any other aerodynamic fairings required to seal the inner gas-washed surface of the fan stage.

The nosecone 106 extends in a radial sense from the engine principal rotational axis X-X to a radius $R_H$. In the present embodiment, the radius $R_H$ is defined as the radius of the gas-washed surface of the hub 105 (i.e. the portion radially outside any platform) measured at the leading edge (or axially forwardmost) part of the fan blades 104.

The fan blades 104 extend in a radial sense to a radius $R_T$. In the present embodiment, the radius $R_T$ is defined as the radius of the blade tip measured at the leading edge (or axially forwardmost) part of the fan blades 104. Each of the fan blades 104 may therefore be defined as having a radial span height extending from their leading-edge roots at radius $R_H$ (0 percent span position) to their leading-edge tips at radius $R_T$ (100 percent span position).

In an embodiment, the fan assembly 102 may have a fan diameter (i.e. double the radius $R_T$) of from 1.22 metres (about 48 inches) to 3.56 meters (about 140 inches). In the present non-limiting embodiment, the fan assembly 102 has a fan diameter of 3 metres (about 118 inches).

A hub-tip ratio may be defined as the quotient of $R_H$ (the dividend) and $R_T$ (the divisor). In an embodiment, the hub-tip ratio may be from 0.15 to 0.4. In the present non-limiting embodiment, the fan assembly 102 has a hub-tip ratio of 0.37. In an alternative non-limiting embodiment, the fan assembly could have a hub-tip ratio of 0.2.

In operation, the fan assembly 102 rotates, and generates two pressurised airflows: a bypass flow B which passes axially through a bypass duct 103, and a core flow C which enters a core gas turbine. The core gas turbine comprises, in fluid flow series, an intermediate-pressure compressor 107, a high-pressure compressor 108, a combustor 109, a high-pressure turbine 110, an intermediate-pressure turbine 111, a low-pressure turbine 112. A nacelle 113 generally surrounds the engine 101 and defines both an intake 114 and an exhaust nozzle 115.

In operation, the core flow C is compressed by the intermediate-pressure compressor 107 and is then directed into the high-pressure compressor 108 where further compression takes place. The compressed air exhausted from the high-pressure compressor 108 is directed into the combustor 109 where it is mixed with fuel and the mixture is combusted. The resultant hot combustion products then expand through, and thereby drive, the high-pressure turbine 110, the intermediate-pressure turbine 111, and the low-pressure turbine 112, before being exhausted via the exhaust nozzle 115 to provide a small proportion of the overall thrust.

The high-pressure turbine 110 drives the high-pressure compressor 108 via an interconnecting shaft. The intermediate-pressure turbine 111 drives the intermediate-pressure compressor 107 via another interconnecting shaft. The low-pressure turbine 112 drives the fan assembly 102 via yet another interconnecting shaft. The three interconnecting shafts are arranged concentrically around X-X. Those skilled in the art will recognise the engine 101 as having a direct-drive, three-shaft architecture.

It will be appreciated that in other embodiments, the engine 101 could alternatively be configured as a direct-drive, two-shaft architecture in which the intermediate-pressure spool is omitted. In one such configuration, both the intermediate-pressure compressor 107 and the intermediate-pressure turbine 111 may be omitted. In operation, the fan blades 105 would provide an initial stage of compression, with the remainder of the overall pressure ratio of the engine 101 being delivered by the high-pressure compressor 108. Another direct-drive, two-shaft architecture may be implemented by providing a booster compressor between the fan assembly 102 and the high-pressure compressor 108, the booster compressor being driven by the low-pressure turbine 112.

In other embodiments, the engine 101 may be configured with a geared architecture, in which the low-pressure turbine 112 drives the fan assembly 102 via a reduction gearbox. The reduction gearbox may be an epicyclic gearbox of star, planetary or compound configuration. Alternatively, the reduction gearbox may be of any other suitable configuration, such as layshaft.

Figure 2:
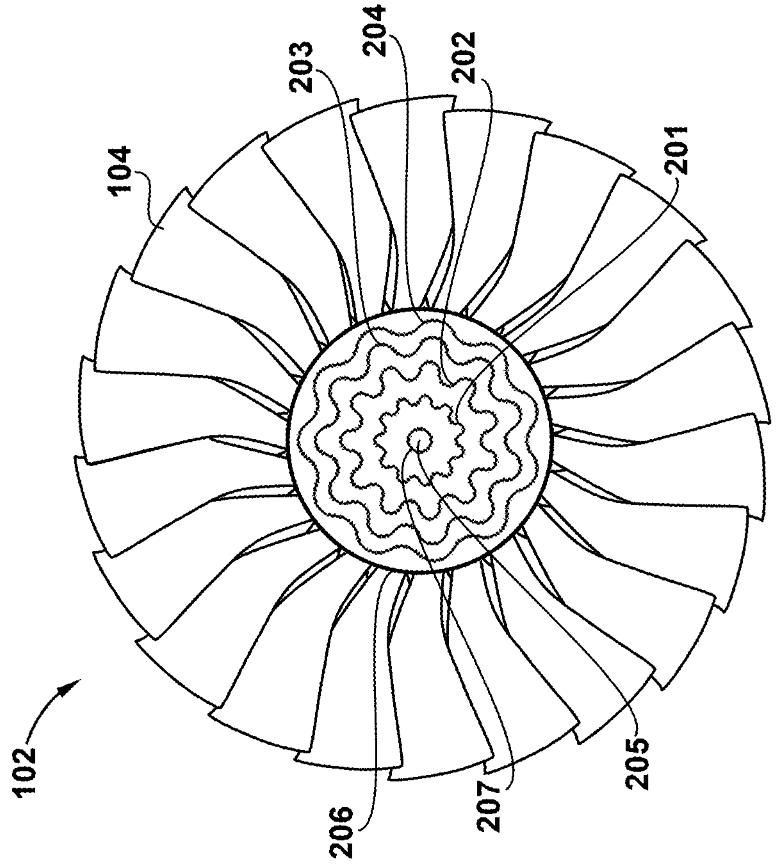
FIG. 2 shows a fan assembly of the ducted fan gas turbine engine of FIG. 1.

Referring again to the drawings, the fan assembly 102 is shown in plan view in FIG. 2. As described previously, the fan assembly 102 comprises a plurality of fan blades 105 and a nosecone 106. In an embodiment, the fan assembly 102 may comprise from 16 to 24 fan blades. It will be appreciated by those skilled in the art that the selection of the precise number of fan blades will be a multifactorial consideration, and may be dependent on the engine performance requirements, material selection, cost considerations, etc. In the present non-limiting embodiment, the fan assembly comprises 22 fan blades.

Figure 3:
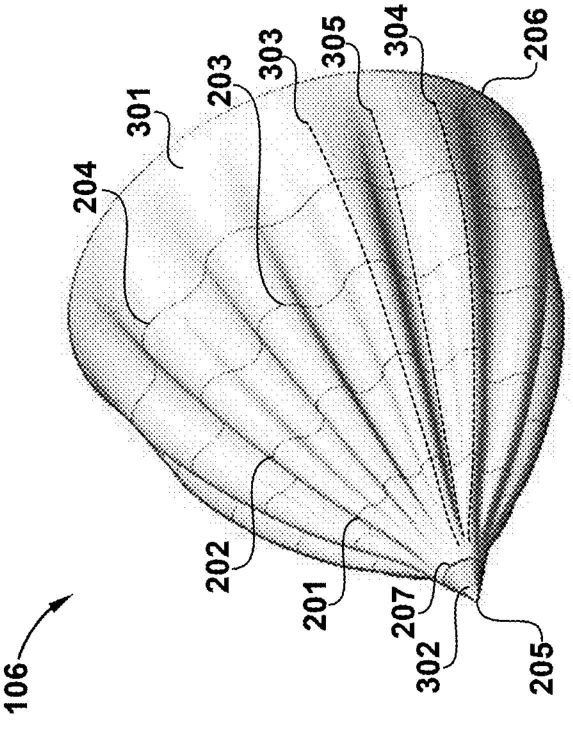
FIG. 3 is a perspective view of a nosecone of the fan assembly of FIG. 2.

A perspective view of the nosecone 106 is shown in FIG. 3. The nosecone 106 for the engine 101 is formed from a body having an outer surface 301. The outer surface 301 tapers in axial extent from an apex 205 to a base 206 of the body. As defined herein, the apex defines a position of 0 percent axial extent and the base defines a position of 100 percent axial extent. The outer surface 301 comprises a plurality of undulations that extend between a first location on the outer surface and a second location on the outer surface. Generally, the first location may be positioned at from 0 to 50 percent of axial extent and the second location may be positioned at from 85 to 100 percent of axial extent. This configuration will be described further with reference to FIG. 4B.

Referring briefly to FIG. 2, exemplary profiles for the undulations are visualised in the drawing by a series of contour lines 201, 202, 203, and 204 axially spaced apart between the apex 205 and the base 206 of the nosecone 106. It will be appreciated that, in the drawings, the contour lines 201, 202, 203, and 204 are imaginary and are included in the drawings solely as a visual aid.

In this embodiment, the base 206 is circular with a radius $R_H$. This allows the base 206 to mate up to the platforms of the fan blades 104 at radius $R_H$ in a smooth, aerodynamic manner. In alternative embodiments, such as will be described further with reference to FIG. 6A and FIG. 6B, the base 206 may be non-circular.

Referring again to FIG. 3, in the present embodiment, a region between the apex 205 and a circumference 207 forms a nosecone tip 302. In this embodiment, the nosecone tip 302 is of conical shape, whereby the undulations extend aft of a first location positioned at from 0 to 50 percent of axial extent of the body. In a specific embodiment, the nosecone tip 302 is formed of an elastomeric material. This may assist with shedding of any ice accreted thereon during operation of the engine 101. It will be appreciated that in other embodiments, the undulations defined on the outer surface 301 of the body of the nosecone 106 could extend aft immediately from the apex 205. In alternative embodiments, such as will be described further with reference to FIG. 5A and FIG. 5B, a smooth, non-undulated section of greater axial extent may be provided.

Referring again to FIG. 3, each of the plurality of undulations defined on the outer surface 301 extends in a circumferential sense between two adjacent peaks with a trough defined therebetween. For example, an undulation may be defined by a first peak 303 and a second peak 304, with a trough 305 defined therebetween. In the present embodiment, the undulations are smooth—i.e. there is no discontinuity in their circumferential profile. As will be described further with reference to FIG. 4B, in a specific embodiment the axial profile of the peaks, such as first peak 303 and second peak 304, may be hyperbolic.

In the present embodiment, the outer surface 301 of the body of the nosecone 106 is shaped such that undulations extend at least in part in an axial direction. In the embodiment illustrated in FIG. 2 and FIG. 3, the undulations extend parallel to the principal rotational axis X-X. In an alternative embodiment, the undulations may be inclined at an angle relative to the principal rotational axis X-X. The angle may possibly take into account the rotational velocity of the undulations during the operation of the engine 101. In the present embodiment, the undulations are linear. In an alternative embodiment, the undulations may follow a curve.

The undulations present on the nosecone 106 create turbulence as the fan assembly 102 rotates by generating variations in the static pressure field of the intake air A. This turbulent flow interacts with and causes faster decay and dissipation of the vortical flow at the root of the fan blades 104. In turn, this reduction in vorticity increases the aerodynamic efficiency of the fan blades 104 at the root.

The variation in the static pressure field of the intake air A also influences the formation of secondary loss cores at roots of fan blades 104. In operation, the intensity of these loss cores is reduced which results in a reduction in the induced forcing vibrations of the front stages of the intermediate-pressure compressor 107, which can, left unchecked, result in failure components in service.

It is therefore envisaged that nosecones as set out herein may not only be provided for newly-certificated engines, but may be also be retrofitted to an existing engine type. In this way, performance of the existing engine type may be improved by replacing any installed nosecone with a nosecone as set out herein.

In an embodiment, the number of fan blades 104 on the fan assembly is an integer multiple of undulations on the outer surface 301. Additionally or alternatively, a ratio of the number of undulations on the outer surface 301 of the body of the nosecone 106 to the number of fan blades 104 is from 0.5 to 2.

In the present non-limiting embodiment, with the fan assembly 102 comprising 22 fan blades, there are eleven undulations on the outer surface 301 of the body of the nosecone 106, giving a ratio of the aforesaid definition of 1:2.

In alternative embodiments, the number of fan blades 104 on the fan assembly may be a non-integer multiple of undulations on the outer surface 301 of the body of the nosecone 106.

In an embodiment, the outer surface 301 may comprise from 8 to 48 undulations. In a specific embodiment, the outer surface 301 may comprise from 10 to 44 undulations.

In the present embodiment, the nosecone 106 is mounted such that the peaks of the undulations are each aligned in a circumferential sense with a respective one of the fan blades 104. It will be appreciated that this condition is possible when the number of undulations is equal to or less than the number of fan blades 104, as in the embodiment illustrated in FIG. 2 and FIG. 3.

In an alternative embodiment, applicable where the number of undulations on the outer surface 301 of the body of the nosecone 106 is equal to or greater than the number of fan blades 104, the nosecone 106 is mounted such that each of the fan blades 104 is aligned in a circumferential sense with a peak of an undulation.

It will be appreciated that in other embodiments, the peaks may not align with some or all of the fan blades 104.

Figure 4B:
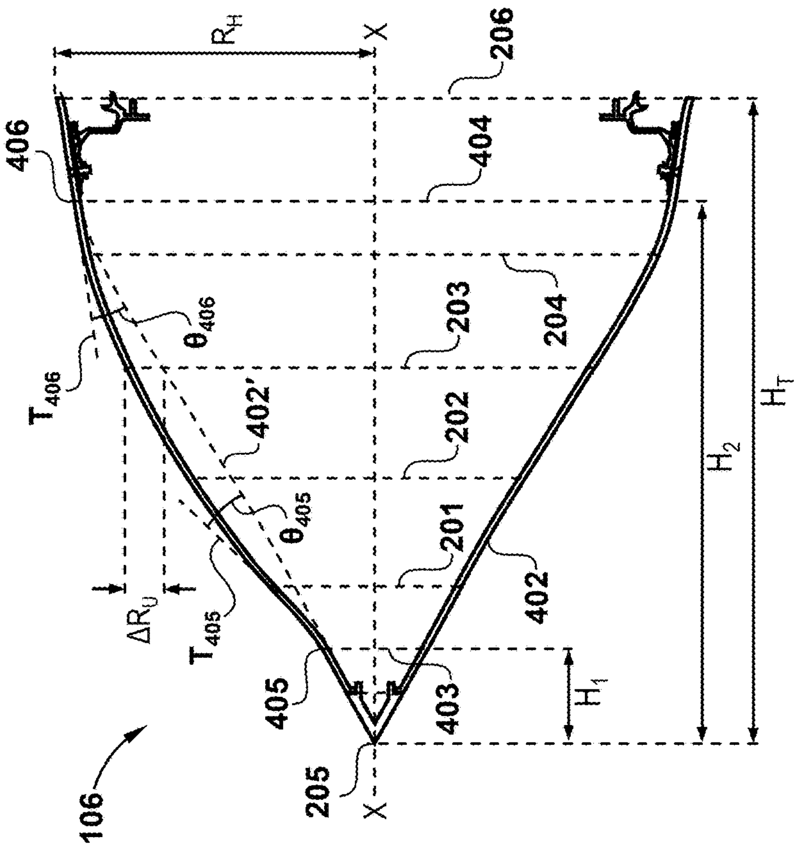
FIG. 4B is a view on section I-I of FIG. 4A.
Figure 4A:
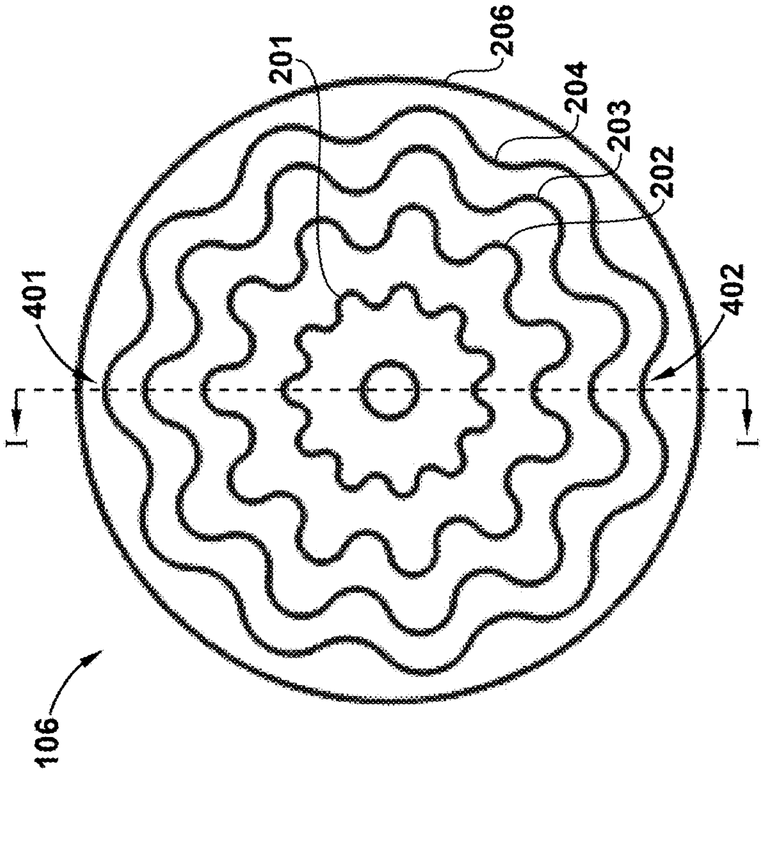
FIG. 4A is a plan view of the nosecone of FIG. 3.

The nosecone 106 is shown in plan view in FIG. 4A, and a view on section I-I thereof is shown in FIG. 4B.

As described previously, in the illustrated non-limiting embodiment, the outer surface 301 of the body of the nosecone 106 comprises eleven undulations. Hence, as shown in FIG. 4A, along the section I-I exists a peak 401 at the twelve-o'clock position, and a trough 402 at the six-o'clock position.

The undulations formed by, for example, peak 401 and trough 402 extend between a first location 403 on the outer surface 301 and a second location 404 on the outer surface 301. The first location 403 is located an axial distance $H_1$ from the apex 205, and the second location 404 is located an axial distance $H_2$ from the apex 205. As described previously, the apex 205 defines a position of 0 percent axial extent, and the base 206 defines a position of 100 percent axial extent. With the base 206 being an overall axial distance $H_T$ from the apex 205, the position of the first location 403 may be expressed in percentage terms of the overall axial extent of the nosecone 106 by dividing $H_1$ by $H_T$, and similarly the position of the second location 404 may be expressed in percentage terms of the overall axial extent of the nosecone 106 by dividing $H_2$ by $H_T$.

As described previously, the first location 403 may be positioned at from 0 to 50 percent of axial extent, and the second location 404 may be positioned at from 85 to 100 percent of axial extent.

In a specific embodiment, the first location 403 may be positioned at from 5 to 25 percent of axial extent. Hence, the body of the nosecone 106 comprises a smooth non-undulated section between the apex 205 and the first location 403. In the embodiment shown in FIG. 4B, the first location 403 is positioned at 15 percent of axial extent.

In an embodiment, the second location 404 may be positioned at less than 100 percent of axial extent. Hence the base 206 may be configured to be circular.

In a specific embodiment the second location may be positioned at from 85 to 95 percent of axial extent. In the embodiment shown in FIG. 4B, the second location 404 is located at 85 percent of axial extent.

It will be appreciated that, in some embodiments, a degree of blending from the non-undulating parts of the outer surface 301 to the undulating parts may be implemented, particularly for the transition to the peaks 401. The region of blending may be of the order of from 0 to 1 percent of axial extent, or from 1 to 2 percent of axial extent, or from 2 to 3 percent of axial extent, or any other value of axial extent. The region of blending may be determined as the amount required to achieve satisfactory aerodynamic performance.

In a specific embodiment, the profile of the outer surface 301 along the peak 401 does not, at any axial position, exceed the radius $R_H$. Hence, it may be seen that the maximum diameter of outer surface 301 along each peak does not exceed a leading-edge hub diameter of the fan assembly 102.

The profile of the peak 401 is compared with the profile of the trough 402 in FIG. 4B, whereby a reflected version of the profile of the trough 402' is shown reflected about the principal rotational axis X-X. Every point along the profiles of the peak 401 and the trough 402 lies a radius $R_U$ away from the principal rotational axis X-X. In a specific embodiment, the maximum difference in radius $R_U$ of along the profile of the peak 401 and the radius $R_U$ of along the profile of the trough 402—hereinafter $\Delta R_U$—is up to 10 percent of the radial span height of the fan blades 104.

In an embodiment, $\Delta R_U$ may be up to 140 millimetres. In another embodiment, $\Delta R_U$ may be up to 111 millimetres.

As described previously, the peaks of the undulations, such as peak 401, may comprise a hyperbolic axial profile between the first location 403 and the second location 404. As illustrated in FIG. 4B, the hyperbolic axial profile of the peak 401 may be defined by a pair of tangent lines. A first tangent line $T_{405}$ may be established at a first point 405, located at the first position 403 on the outer surface 301. A second tangent line $T_{406}$ may be established at a second point 406, located at the second position 406 on the outer surface 301. The tangent lines $T_{405}$ and $T_{406}$ define the asymptotes of the hyperbola used to define the axial profile of the peak 401.

In various embodiments, the tangent line $T_{406}$ declines towards the apex 205 end of the nosecone, i.e. it does not lie parallel to the engine axis X-X.

As illustrated in FIG. 4B, the tangent $T_{405}$ and $T_{406}$ define respective angles $\theta_{405}$ and $\theta_{406}$ relative to the notional profile of trough 402'. In an embodiment, the angles $\theta_{405}$ and $\theta_{406}$ are from 0 to 45 degrees. In some embodiments, the angles $\theta_{405}$ and $\theta_{406}$ may be the same. In other embodiments, the angles $\theta_{405}$ and $\theta_{406}$ may differ.

Figure 5B:
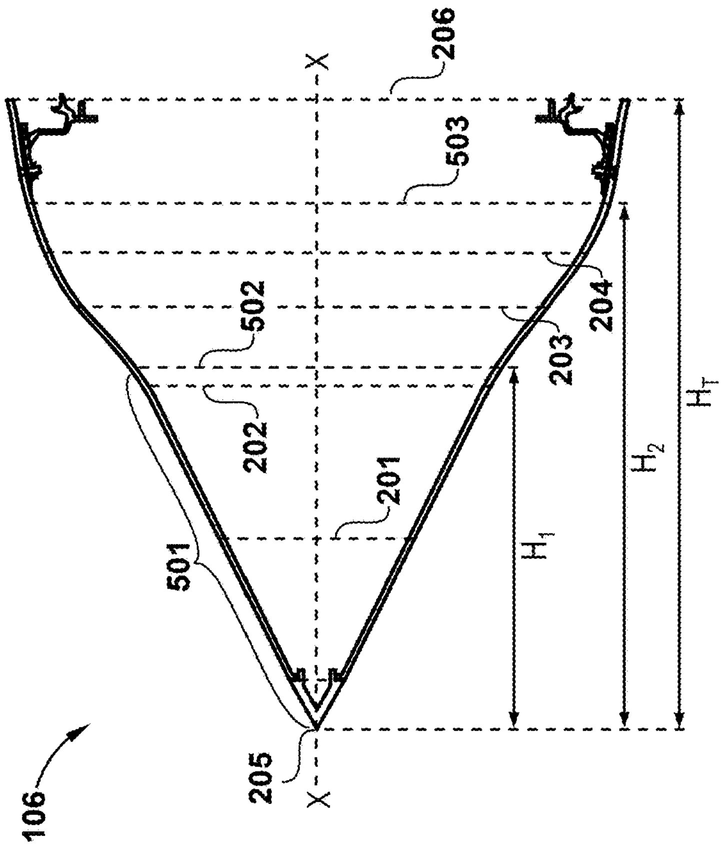
FIG. 5B is a view on section II-II of FIG. 5A.
Figure 5A:
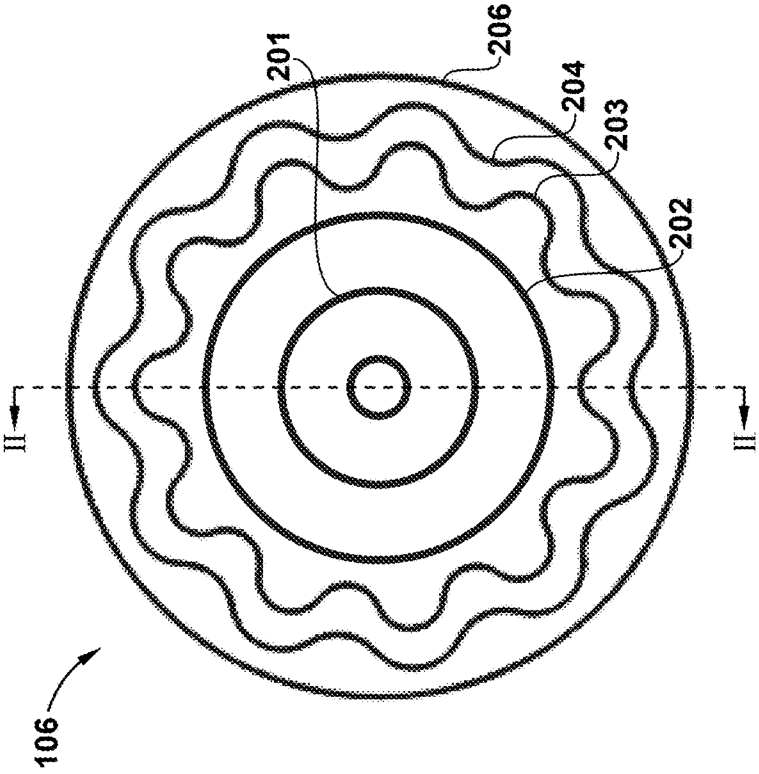
FIG. 5A is a plan view of the nosecone of FIG. 3 with a smooth, non-undulated section.

FIG. 5A and FIG. 5B illustrate an embodiment of the nosecone 106 in which the outer surface 301 of the body may comprise a larger smooth, non-undulating section 501 extending between the apex 205 and a first location 502. This embodiment of the nosecone 106 is shown in plan view in FIG. 5A, in which the contour 202 is circular and indicates a smooth, non-undulating profile.

As shown in FIG. 5B, which is a view on section II-II of FIG. 5A, undulations are defined on the outer surface 301 of the body of the nosecone 106 between the first location 502 and a second location 503. In this embodiment, the first location 502 is positioned at 50 percent of axial extent. As described previously, in various embodiments the undulations may, variously: extend at least in part in an axial direction; extend parallel to the principal rotational axis X-X; extend at an angle relative to the principal rotational axis X-X; be linear; be curved.

Figure 6B:
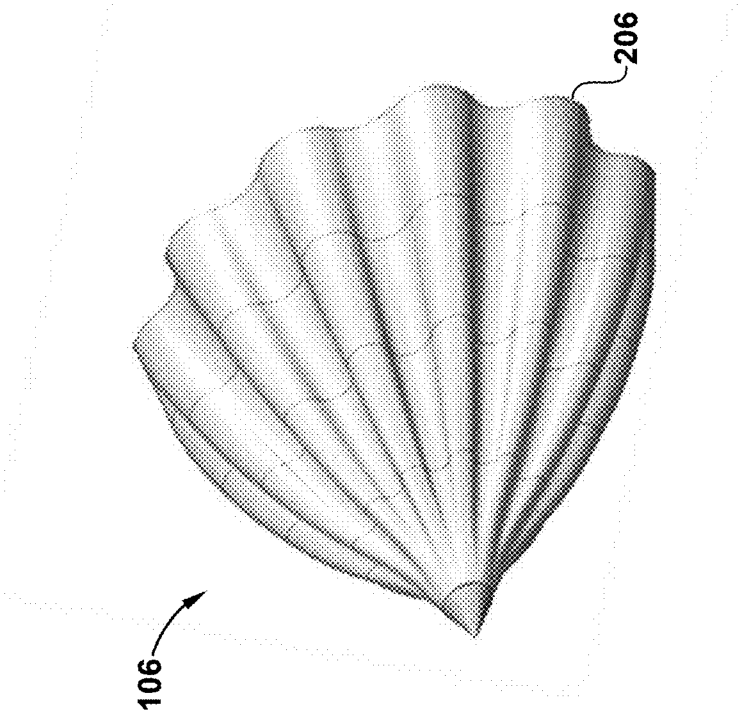
FIG. 6B is a perspective view of the nosecone of the fan assembly of FIG. 6A.
Figure 6A:
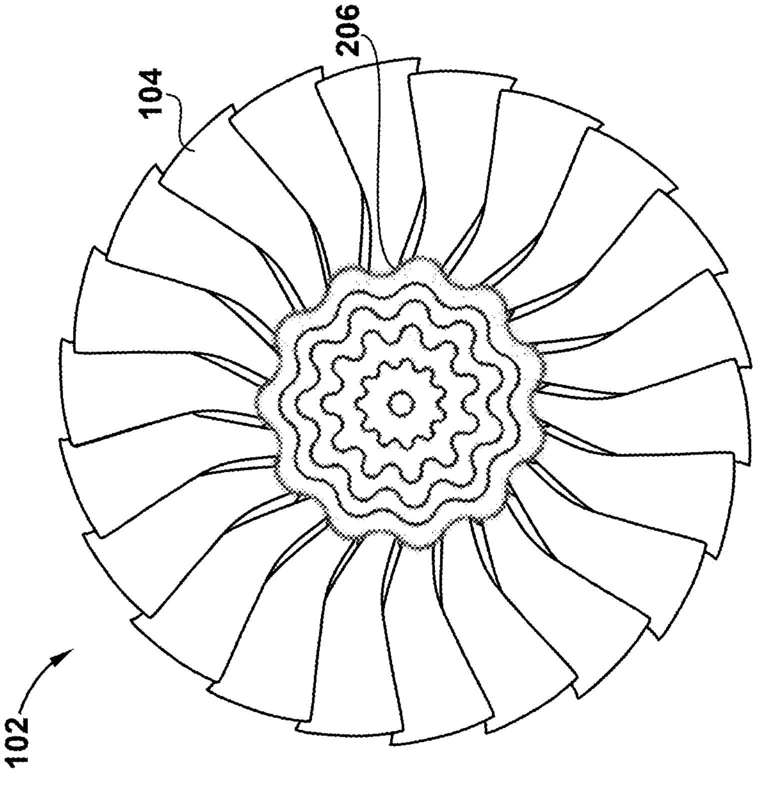
FIG. 6A shows the fan assembly of the ducted fan gas turbine engine of FIG. 1 in which the nosecone has undulations extending to its base.

FIG. 6A and FIG. 6B illustrate an embodiment of the fan assembly 102 in which the outer surface 301 comprises undulations that extend to the base 206 of the body of the nosecone 106. The second location is the base 206 itself and is hence positioned at 100 percent of axial extent. The undulations extend to the base 206, and so the base 206 is also undulated. In this way, further control of the generation of turbulent flow by the undulations and the aerodynamic interaction with the fan blades 104 may be achieved during operation of the engine 101.

Various examples have been described, each of which comprise various combinations of features. It will be appreciated by those skilled in the art that, except where clearly mutually exclusive, any of the features may be employed separately or in combination with any other features and the scope of the subject-matter disclosed extends to and includes all combinations and sub-combinations of one or more features described herein.

The invention claimed is:

1. A nosecone for a ducted fan gas turbine engine, the nosecone comprising a body with an outer surface that tapers in axial extent from an apex to a base of the body, the apex defining a position of 0 percent axial extent and the base defining a position of 100 percent axial extent, and in which the outer surface comprises a plurality of undulations extending between a first location on the outer surface and a second location on the outer surface, wherein the first location is positioned at from 0 to 50 percent of axial extent and the second location is positioned at from 85 to 100 percent of axial extent, each of the plurality of undulations extends circumferentially between a peak and a trough, and a maximum diameter of the outer surface along each peak does not exceed a leading-edge hub diameter of a fan assembly of the ducted fan gas turbine engine.

2. The nosecone of claim 1, in which the second location is positioned at less than 100 percent of axial extent and the base of the body is circular.

3. The nosecone of claim 1, in which the second location is positioned at 100 percent of axial extent and each of the plurality of undulations extend to the base of the body, whereby the base is undulated.

4. The nosecone of claim 2, in which the first location is positioned at from 5 to 25 percent of axial extent, and the outer surface of the body comprises a smooth, non-undulated section between the apex and the first location.

5. The nosecone of claim 1, in which the outer surface comprises from 8 to 48 undulations.

6. The nosecone of claim 5, in which the outer surface comprises from 10 to 44 undulations.

7. The nosecone of claim 1, in which each of the plurality of undulations extends circumferentially between a first peak and a second peak with the trough therebetween, and a maximum radial difference in extent between peaks and troughs is up to 140 millimetres.

8. The nosecone of claim 1, in which each of the plurality of undulations extends circumferentially between a first peak and a second peak with & the trough therebetween, wherein the first peak and the second peak both have a hyperbolic axial profile defined between the first location and the second location.

9. The nosecone of claim 8, in which the hyperbolic axial profile is defined by tangent lines having a deviation of up to 45 degrees from an axial profile of the trough at the respective first location and second location.

10. The nosecone of claim 1, in which the plurality of undulations extend at least in part in an axial direction.

11. A fan assembly for a ducted fan gas turbine engine, comprising:

a hub with a plurality of fan blades mounted thereto;

a nosecone mounted to the hub comprising a body with an outer surface that tapers in axial extent from an apex to a base of the body, the apex defining a position of 0 percent axial extent and the base defining a position of 100 percent axial extent, and in which the outer surface comprises a plurality of undulations extending between a first location on the outer surface and a second location on the outer surface, wherein the first location is positioned at from 0 to 50 percent of axial extent and the second location is positioned at from 85 to 100 percent of axial extent, each of the plurality of undulations extends circumferentially between a peak and a trough, and a maximum diameter of the outer surface along each peak does not exceed a leading-edge hub diameter of the fan assembly.

12. The fan assembly of claim 11, in which the second location is positioned at less than 100 percent of axial extent and the base of the body is circular.

13. The fan assembly of claim 11, in which the first location is positioned at from 5 to 25 percent of axial extent, and the outer surface of the body comprises a smooth, non-undulated section between the apex and the first location.

14. The fan assembly of claim 11, in which the outer surface of the body comprises a smooth, non-undulated section between the apex and an intermediate location on the outer surface, whereby the plurality of undulations are located between the intermediate location and the base of the body.

15. The fan assembly of claim 11, in which a ratio of the number of the plurality of undulations on the nosecone to the number of fan blades is from 0.5 to 2.

16. The fan assembly of claim 11, in which the number of fan blades is an integer multiple of the number of the plurality of undulations on the outer surface of the nosecone.

17. The fan assembly of claim 11, in which a maximum difference in radial extent between each peak and the trough is up to 10 percent of a leading-edge span height of the plurality of fan blades.

18. The fan assembly of claim 11, in which the plurality of undulations extend at least in part in an axial direction.

19. A nosecone for a ducted fan gas turbine engine, the nosecone comprising a body with an outer surface that tapers in axial extent from an apex to a base of the body, the apex defining a position of 0 percent axial extent and the base defining a position of 100 percent axial extent, and in which the outer surface comprises a plurality of undulations having an axial extent of from 35 to 100 percent of the axial extent of the body, and wherein each of the plurality of undulations extends circumferentially between a first peak and a second peak with a trough therebetween, wherein the first peak and the second peak both have a hyperbolic axial profile defined between the first location and the second location, and a maximum diameter of the outer surface along each of the first peak and the second peak does not exceed a leading-edge hub diameter of a fan assembly of the ducted fan gas turbine engine.

* * * * *